United States Patent
Lambert et al.

(10) Patent No.: US 6,871,443 B2
(45) Date of Patent: Mar. 29, 2005

(54) FLYING INSECT TRAP

(75) Inventors: C. Ronald Lambert, Columbus, NE (US); Kevin D. Sinclair, Columbus, NE (US); Larry R. Taylor, Grand Island, NE (US)

(73) Assignee: Paraclipse, Inc., Columbus, NE (US)

( * ) Notice: Subject to any disclaimer, the term of this patent is extended or adjusted under 35 U.S.C. 154(b) by 0 days.

(21) Appl. No.: 10/392,232

(22) Filed: Mar. 18, 2003

(65) Prior Publication Data

US 2003/0154644 A1 Aug. 21, 2003

Related U.S. Application Data

(63) Continuation of application No. 09/841,200, filed on Apr. 24, 2001, now abandoned.
(60) Provisional application No. 60/200,448, filed on Apr. 28, 2000.

(51) Int. Cl.[7] .............................. A01M 1/04; A01M 1/14
(52) U.S. Cl. ........................................ 43/113; 43/114
(58) Field of Search ........................... 43/107, 113, 114

(56) References Cited

U.S. PATENT DOCUMENTS

| | | | | | |
|---|---|---|---|---|---|
| 4,356,656 A | * | 11/1982 | Tasma | ......................... | 43/113 |
| 5,111,610 A | * | 5/1992 | Morisset | ..................... | 43/132.1 |
| 5,651,211 A | * | 7/1997 | Regan et al. | ................. | 43/113 |
| 6,289,629 B2 | * | 9/2001 | Greening | ..................... | 43/113 |

FOREIGN PATENT DOCUMENTS

| | | | | | |
|---|---|---|---|---|---|
| GB | | 002275409 | * | 8/1994 | ................. 43/113 |

* cited by examiner

Primary Examiner—Kurt Rowan
(74) Attorney, Agent, or Firm—Emrich & Dithmar LLC

(57) ABSTRACT

A flying inspect trap includes large, multi-directional, oppositely facing ingress openings to elongated chambers housing UV lamps emitting insect attractant light. A disposable cartridge has two sections which mate together to form a container for a roll of adhesive trapping medium. The cartridge sections are opened and spread apart to fit beneath the UV lamps. A motor indexes the adhesive medium so that some unused portion is always available for trapping insects until the roll is exhausted. The spent roll is then rolled into one cartridge section externally; and the two cartridge sections are coupled together to encase the spent roll for disposal.

5 Claims, 6 Drawing Sheets

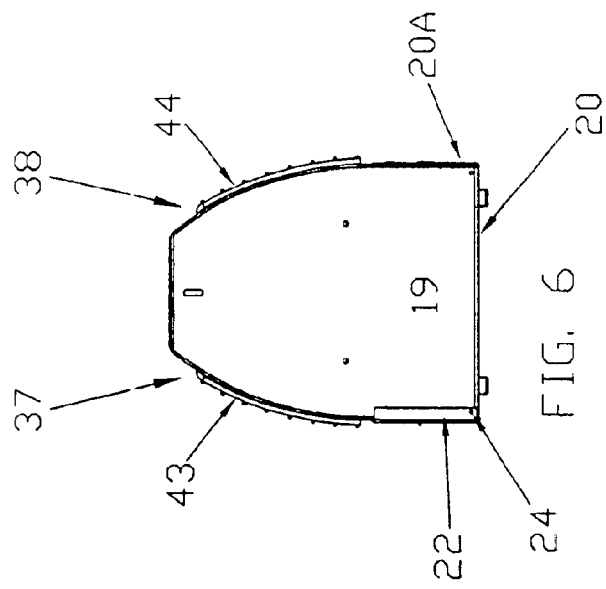
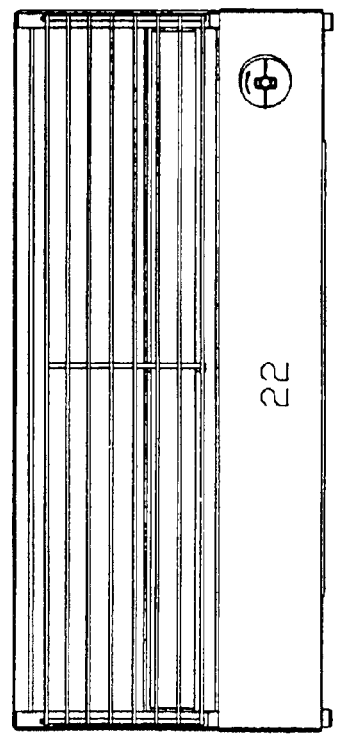
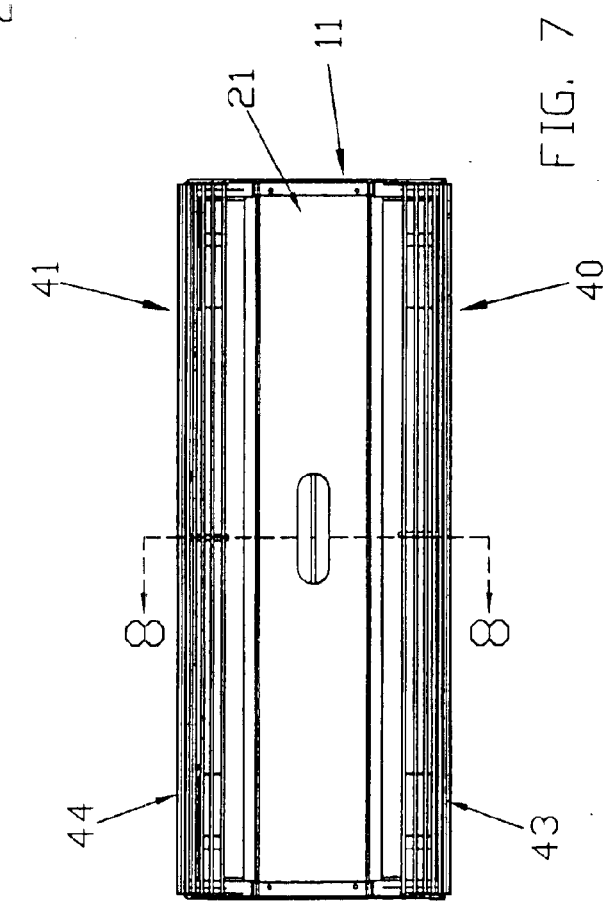

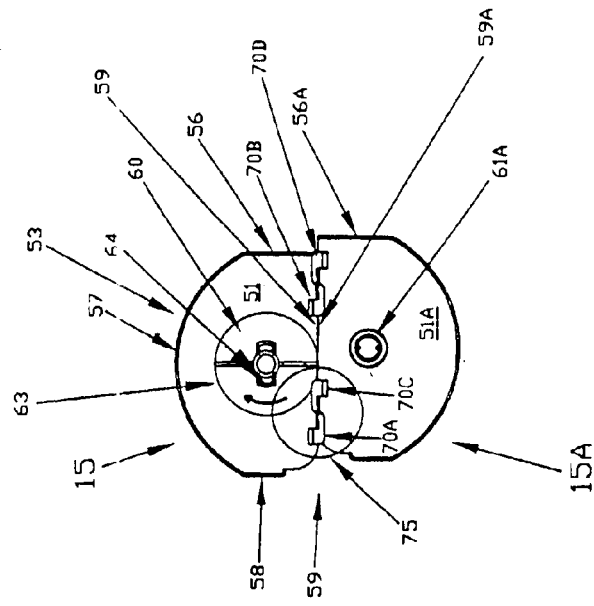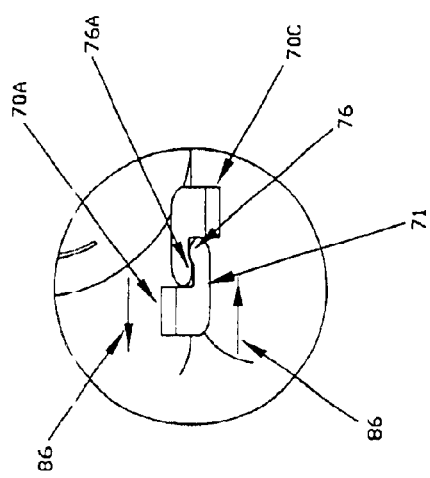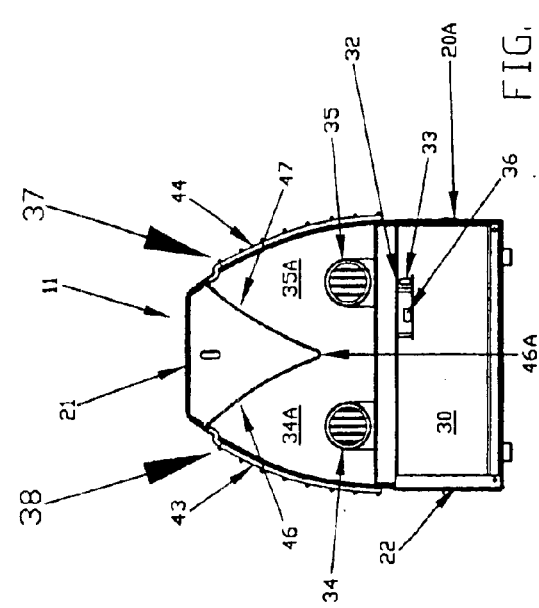

FLYING INSECT TRAP

RELATED APPLICATION

This is a continuation application of U.S. Nonprovisional application Ser. No. 09/841,200 entitled "FLYING INSECT TRAP", filed Apr. 24, 2001, now abandoned, which is based on Provisional Application No. 60/200,448 filed Apr. 28, 2000.

FIELD OF THE INVENTION

The present invention relates to insect traps, and more particularly to traps for flying insects which use ultraviolet (UV) light to draw the insects into the trap where they are immobilized on adhesive-coated boards, paper or other medium.

BACKGROUND OF THE INVENTION

The use of ultraviolet light to attract insects in a localized area and then to immobilize the insects on an adhesive medium or "glue board" is known. Further, it is known to provide food scents and pheromones to attract flies and other insects into the interior of the trap and onto the adhesive medium. One prior trap disclosed in U.S. Pat. No. 5,651,211, is intended to be mounted on a wall and have a decorative cover so that occupants of the room cannot normally see the UV lamps directly. Such decorative traps have application primarily in eating areas of restaurants or the like so that the UV lamps provide indirect lighting on an adjacent wall, but the lamps themselves are not directly visible at eye level. Of course, the insects cannot directly perceive the light source unless the insect is at a sufficiently high altitude. This is believed to have a negative effect on the overall catch effectiveness of the trap since insects are believed to be attracted to the UV light source by sensing light emanating from the source, just as insects are attracted to windows because they sense the incoming light radiated from the sun. Most prior traps are not of a decorative design. The interior of these traps, many of which use electrocution techniques for killing the insects but some of which also use UV light to attract the insects and glue boards to trap them, may be readily viewed by occupants of a room in which they are used.

SUMMARY OF THE INVENTION

The present invention, unlike wall-mounted decorative units for use primarily in the eating areas of restaurants, is designed for heavier commercial or industrial use. For example, flies are attracted to and collect in large numbers in the production areas of commercial kitchens, bakeries, food processing plants, and storage areas in supermarkets, warehouses, hospitals, poultry and egg ranches, as well as in all food preparation areas where the decorative appeal of the trap is not as important as trapping effectiveness.

Thus, the present invention provides two separate UV lamps arranged generally in the same horizontal plane and spaced slightly laterally from one another. The lamps are mounted in an elongated housing which has upright sidewalls and a base, but which is provided with open grills adjacent the horizontal plane in which the UV lamps are mounted so that the lamps can be viewed directly in a range of elevations extending from slightly below the horizontal plane of the lamps to a region well above the lamps. Moreover, the shape of the housing in side profile is such that it curves upwardly and inwardly of the UV lamps, as one proceeds from the level of the UV lamps upward. This increases the access of the insects to the UV lamps, not only by sight, but by ingress, from an angle slightly below the horizontal to approximately 80° above the UV lamps. Access is provided on both sides of the housing to increase the effectiveness even more. In addition, curved reflective surfaces are placed at an incline to the center of the unit and above the UV lamps to project an image of the UV lamps outwardly and downwardly so that it can be perceived from most regions in a room and extends the viewing angles well below the horizontal. Thus, an insect in front of the unit sees not only the UV lamp directly, but the image of the lamp, and this occurs on both sides of the unit.

Furthermore, the insect trapping medium, which is commercially available, has a sticky or tacky surface impregnated with the attractants described above. The medium is stored in a cartridge until use. The trapped insects become encapsulated in a take-up section, while simultaneously a fresh adhesive surface is automatically advanced from a source spool. U.S. Pat. No. 5,651,211 teaches the use of a cartridge for housing the trapping medium in a roll and dispensing it for usage under timed motor power. The present invention improves such a cartridge design by housing a roll of trapping medium in a cartridge made of two mating sections which are preferably identical and interchangeable to reduce parts and inventory. The two housing sections couple together to form a substantially closed container encompassing the trapping medium either for storage when the medium has not been used, or for disposal when the trapping medium is filled with insects.

After shipment or storage, when it is desired to replace an existing cartridge, the new cartridge is split apart manually, without the need for tools, and the two housing sections are separated by hand to a distance sufficient that they may fit into receptacles in the trap. One of the housing sections is placed in a receptacle and coupled to the drive shaft of an electric motor which, when energized, drives a take-up spool for winding the spent trapping paper into the associated housing section, while metering out unused trapping medium from the other housing section which is stored in a remote receptacle.

The intermediate section of the trapping medium between the two housing sections slides along a flat table spaced immediately below the two UV lamps. After the trapping medium is fully spent and it is desired to dispose of the trapping medium and replace it with a new cartridge, the two housing sections of the cartridge are removed from their respective receptacles (the one driven by the motor is disconnected from the motor), and the two housing sections of the cartridge are then manually assembled together and secured, encompassing the spent medium and insects for disposal without having to touch the spent medium or insects. The trailing edge of the trapping medium may be manually wound into the driven cartridge section, without touching the trapping medium.

The trapping medium, as it passes over the support table beneath the UV lamps, passes over and occludes an aperture in the table below which there is mounted a light sensor. When the trapping medium runs out, the trailing edge passes over the aperture, and the sensor senses the light from the UV source, indicating that the unit is out of trapping medium. The unit generates an audible alarm to signal that the cartridge must be removed and replaced.

Another feature of the invention is that the motor which draws the adhesive-coated trapping medium out of one cartridge section and into the other when the trapping medium is assembled in the trap, may be set in one of two different motor speeds so that the trapping mediums is metered out either more slowly or more rapidly, as desired, and depending upon use conditions.

Other features and advantages of the present invention will be apparent to persons skilled in the art from the following detailed disclosure of the preferred embodiment accompanied by the attached drawings, wherein identical reference numerals will refer to like parts in the various views.

BRIEF DESCRIPTION OF THE DRAWING

FIG. 5 is a front elevational view of the trap of FIG. 1;

FIG. 6 is a right side view of the inventive trap;

FIG. 7 is a plan view of the inventive trap;

FIG. 8 is a vertical cross-sectional view taken through the sight line 8—8 of FIG. 7;

FIG. 9 is an end view of the two cartridge sections placed in a closed position and just before locking sections together; and FIG. 10 is an enlarged view of the portion of FIG. 9 enclosed by the line 75.

DETAILED DESCRIPTION OF THE PREFERRED EMBODIMENT

Figure 1:
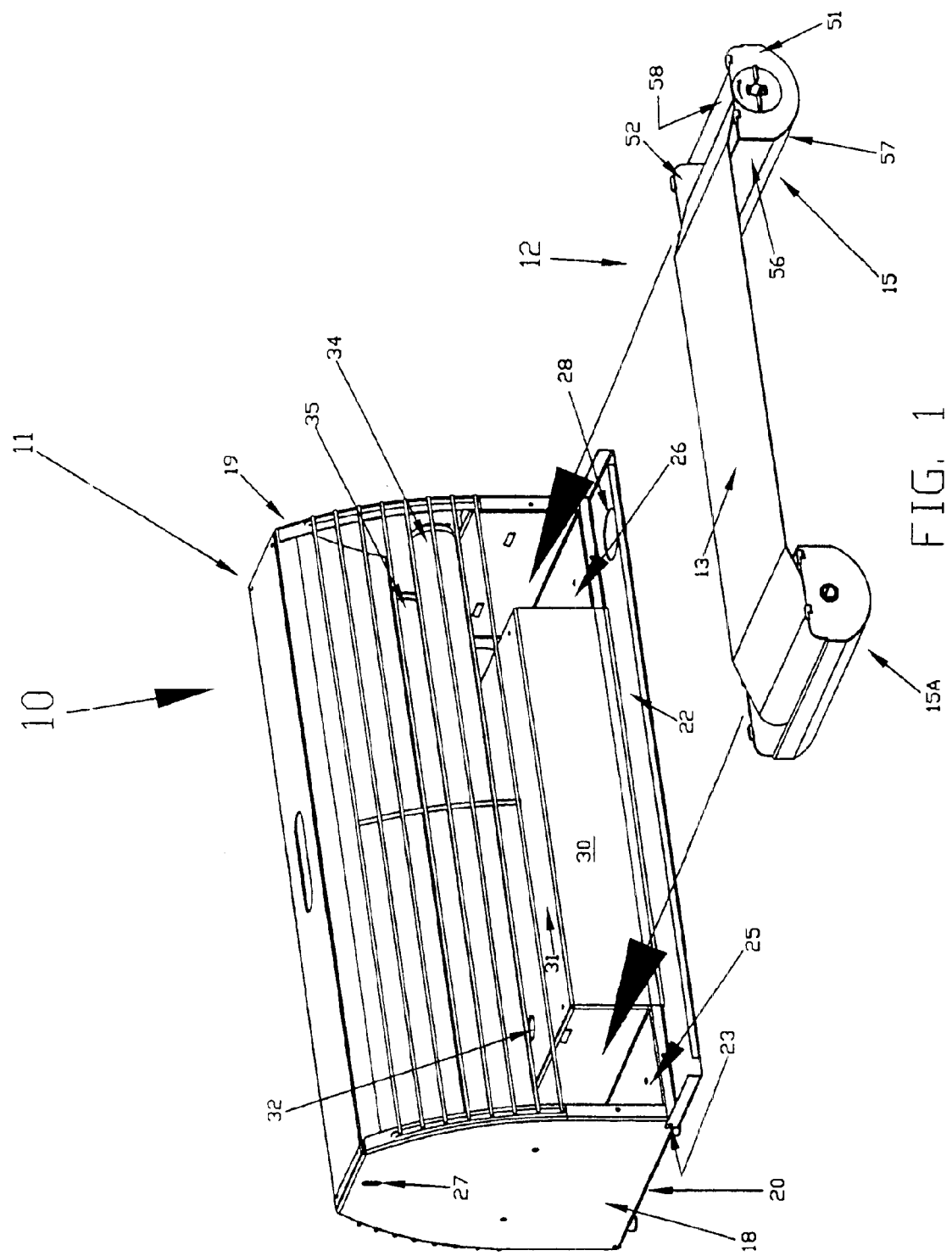
FIG. 1 is an upper, frontal perspective view of the inventive insect trap with the cartridge door open and the cartridge sections split in preparation for insertion into the trap.
Figure 3:
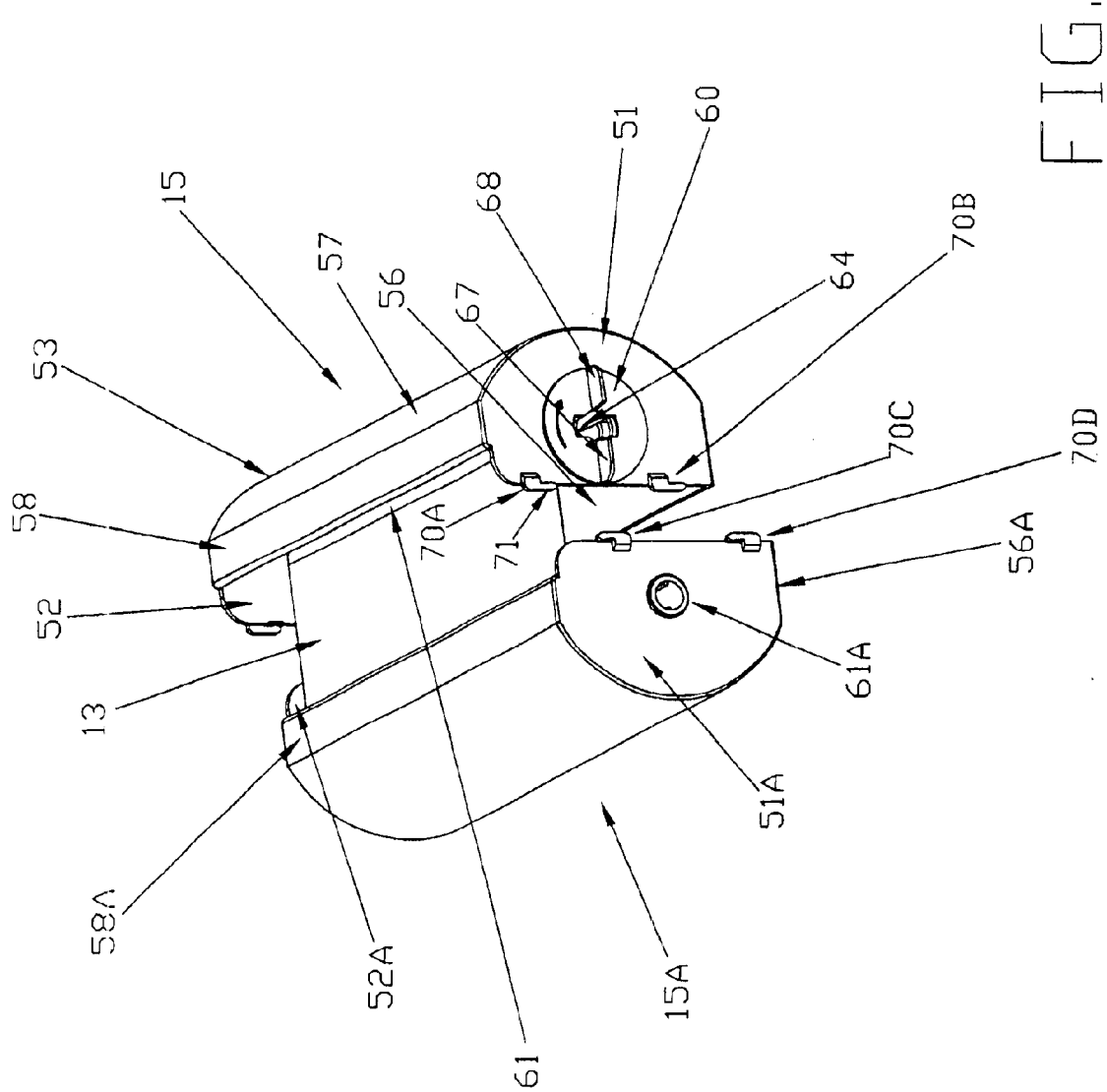
FIG. 3 is an upper, frontal perspective view of the split cartridge which houses the trapping medium.

Turning first to FIG. 1, reference numeral 10 generally designates a trap for flying insects. The trap 10 comprises a housing generally designated 11 and a replaceable cartridge 12 for housing and supplying trapping medium shown in the form of an elongated web and designated 13 in FIG. 1. The cartridge 12 is seen in FIG. 1 with first and second complimentary and similar sections 15, 15A spread apart for insertion into the trap 10, as will be described. In FIG. 3, the cartridge sections 15, 15A have been disconnected from each other, and if the cartridge sections are spread further apart, the exposed surface of the trapping medium 13 will, of course, be increased. A feature of the invention is that the same cartridge design may be used for different size traps having different lengths of exposed trapping medium, as persons skilled in the art will appreciate.

Returning now to FIG. 1, the housing 11 is elongated laterally to accommodate two fluorescent lamps, to be described. The housing 11 has a left upright sidewall 18 and a right sidewall 19. Sidewalls 18 and 19 are generally flat with inwardly turned flanges for connecting to the other housing walls and the grills. Terms such as "left," "right," "front," and "rear" have reference to a viewer looking on the elongated side (the "front") of the housing which receives the cartridge 12 of trapping medium. From a full description of the invention, it will be appreciated that the insect trap is equally accessible to an insect from the front, seen in FIG. 1, or the rear of the trap. The housing may be made of metal or plastic.

The housing 11 also includes a bottom wall 20 which is integral with the sidewalls 18, 19. A cartridge door 22 is pivotally connected to the bottom portions of the sidewalls 18, 19, respectively, at 23 (FIG. 1) and 24 (FIG. 6). The cartridge door 22 is seen in the lowered position in FIG. 1, permitting access to the interior of the housing 11. Specifically, the housing 11 defines a space or receptacle 25 for receiving the left cartridge section 15A and a corresponding space or receptacle 26 for receiving the right cartridge section 15. The cartridge sections are installed in the direction of the arrows shown. On the right side of the cartridge door 22, there is an aperture 28, the purpose of which will be discussed below.

The two receptacles 25, 26 are separated and partially defined by a metal box 30 which houses the electrical connections, drive motor and the ballast and wiring for the UV lamps, to be described. In the top wall 31 of the metal box 30, there is an aperture 32. First and second UV lamps 34, 35 are mounted in the housing 11 with conventional fluorescent lamp sockets. Beneath the aperture 32 (which is below the lamp 35) within the box 30 is a light sensor (photo transistor) 33 (FIG. 8) which is responsive to the light emanating from the UV lamp 35, to generate an electrical signal upon detection of light from the lamp 35 to actuate an audible alarm shown at 36 in FIG. 8 and housed within the box 30. Other light sensing elements than the photo transistor 33 disclosed herein, may be used to sense incident light passing through the aperture 32 and actuate the audible alarm which, in the illustrated embodiment is a piezo audio transducer which is commercially available. There are many other audible alarms commercially available which are capable of being actuated in this matter and producing desirable audible signals to indicate to the user that the trap has an exhausted supply of trapping medium and the cartridge needs to be replaced, and a new one installed. Moreover, there are mechanisms other than the aperture and lightsensing photo transistor disclosed for generating the signal to actuate the audible alarm. For example, a ball-shaped mechanical sensor could be placed above a detent in the top wall of the box 30 and biased downwardly toward the detent, but maintained in a raised position if the trapping medium is present, and then released to fall into the detent when the trapping medium is exhausted, actuating a position or limit switch which upon movement of an armature supporting the ball when it falls from resting on the trapping medium into the detent covered by the trapping medium. There are many other equally effective devices for assessing the presence of the trapping medium. The UV lamps 34, 35 are fluorescent UV lamps generating light in the near ultra-violet and visible range. Such lamps (sometimes called "black light" lamps) are commercially available and currently used in traps to attract flying insects.

Referring now to FIG. 8, the UV lamps 34, 35 are tubular; and their axes extend horizontally in substantially the same plane. The lamps are spaced slightly apart (approximately two inches or so) so that one lamp, for example, lamp 34, occupies one longitudinal chamber 34A of the housing 11, and the other lamp 35 occupies the other longitudinal chamber 35A of the housing 11.

Referring now to FIGS. 6, 7 and 8, the housing 11 also includes a top wall 21 which has the same width as the bottom wall 20. That is, it extends between the two sidewalls 18, 19 and is affixed to the flanges of those sidewalls. However, the top wall 21 has a depth (i.e., front to rear distance) (FIGS. 7 and 8) which is less than the depth of the bottom wall 20. Thus, the upper portions of the sidewalls are curved inwardly as they proceed upwardly (see FIGS. 2, 6 and 8). This shape provides insect access to the interior of the housing directly from the front or rear (see FIGS. 5 and 7); and it also provides access from above, for example, in the direction of the arrows 37, 38 in FIGS. 6 and 8. Top access to the interior of the housing is also seen in FIG. 7.

Figure 2:
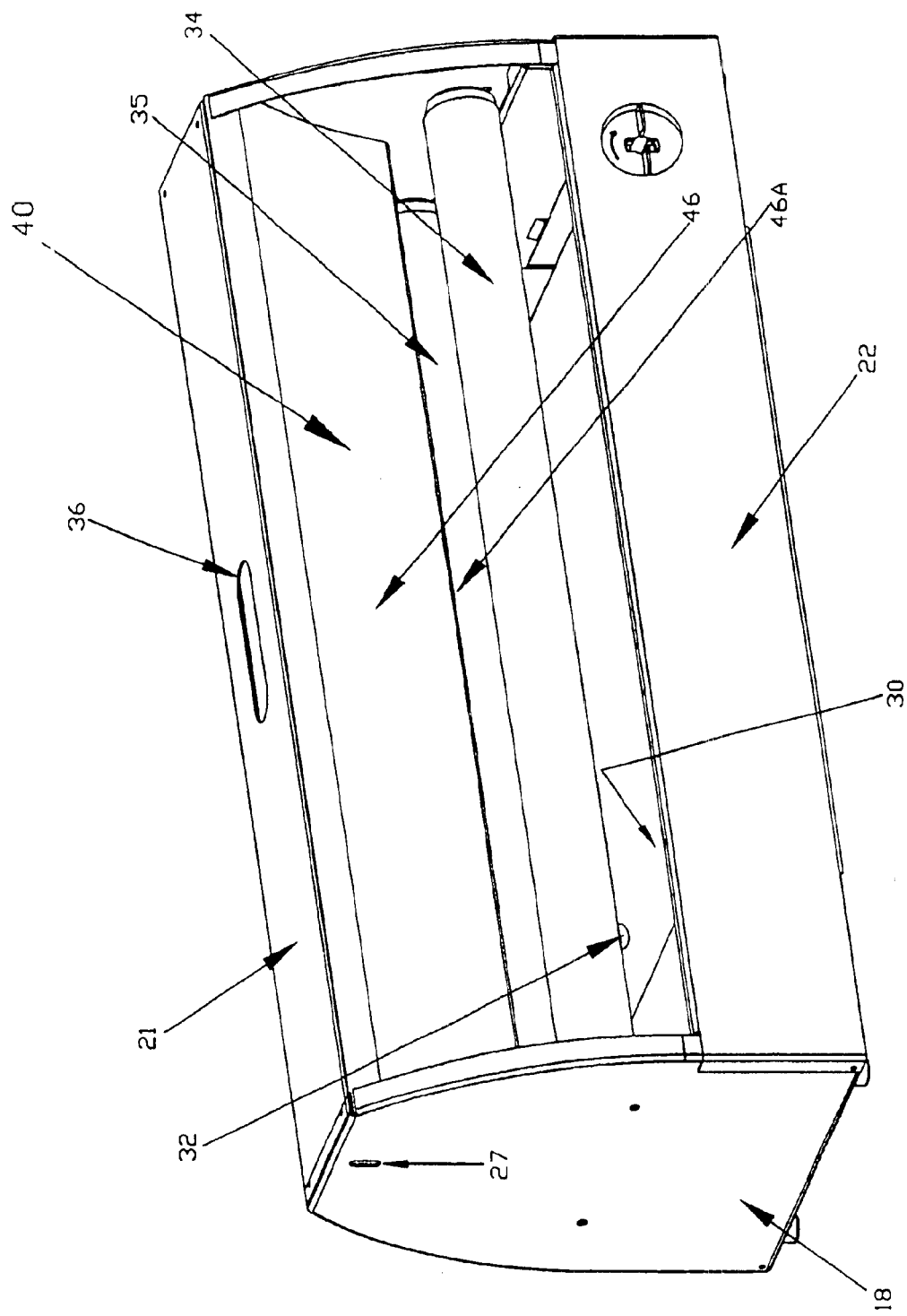
FIG. 2 is an upper, frontal perspective view similar to FIG. 1 with the cartridge door closed and the front grill removed to view the interior of the trap.

Referring now to FIG. 2, the arrangement of sidewalls 18, 19, front cartridge wall 22 and top wall 21 define a large ingress opening 40 for insects. A similar ingress opening at the rear of the unit is shown at 41, FIG. 7. The forward and rearward ingress openings 40, 41 are provided with protective wire grills, designated respectively, 43 and 44, which cover the respective openings to prevent persons from placing their hands or fingers inside the unit. The grills permit easy ingress to flying insects, however.

Referring now to FIGS. 2 and 8, located above the forward chamber 34A which houses the forward fluorescent lamp 34, there is a slightly curved inner wall 46 on which is mounted a highly reflective surface, such as metallized Mylar. The surface 46 is arranged so that the image of the forward UV lamp 34 is projected, mirror-like, out into the room. Due to the slight concave curvature of the wall 46 and the reflective material on it, the reflected image of the lamp 34 is enlarged. The bottom edge 46A of the curved wall 46 is located slightly inward of, and above its associated lamp 34. The wall 46 extends upwardly and outwardly to a position about four and one-half inches above the forward-most surface of the lamp 34 (which is the horizontal forward edge of the glass envelope). A similar reflective wall 47 is provided in the rear chamber above the rear UV lamp 35, and projecting a similar image of lamp 35 out toward the rear of the trap. The curved, reflective walls 46, 47 partially define the two chambers 34A, 35A of the housing 11.

Thus, insects within range, on either side of the trap, will see not only the direct image of a UV lamp, but also an enlarged reflective image. In addition, an insect which is slightly above the horizontal relative to the closest UV lamp (for example, the forward UV lamp 34 in FIG. 2), can, in addition, perceive a good portion of the rear lamp 35 because the lower edges of the curved inner walls 46, 47 terminate slightly above the uppermost surfaces of the glass envelopes of the fluorescent UV lamps 34, 35, as best seen in FIG. 8. Moreover, the included angle through which a lamp may be viewed (the "viewing angle") is increased when the image of the reflected lamp on curved reflective surfaces 46, 47 are considered. Referring to FIG. 8, the reviewing angle is in the vertical plane of the page. An insect may perceive lamp 34 at an angle of almost 80° above the horizontal, at which point the upper portion of the curved wall 46 interferes with light transmission. An insect may perceive the lamp 34 directly at an angle of about 20° below the horizontal. However, an insect may perceive the image of the lamp 34 reflected off the curved surface 46 at a much greater angle below the horizontal. Thus the location and curvature of the reflective surface 46 increases the viewing angle. The angles given are estimates given in order to explain the principle involved and are not to be taken as limitations on the invention or as precise measurements. Persons skilled in the art will be able to modify the dimensional relations shown in the drawing while continuing to practice the invention.

The center portion of the top wall 21 is provided with a cut-out in the form of an elongated opening designated 36 which serves as a handle or carrier for the unit. In addition, the sidewalls 18, 19 are provided in their upper central portions with smaller slots such as that designated 27 in FIGS. 1 and 6 for the left sidewall 18 for receiving hooks so that the unit may be suspended from a ceiling or the like by means of a chain provided with carrying hooks.

The UV lamps 34, 35 are mounted in conventional sockets mounted to the sidewalls 18, 19; and they are energized with a conventional ballast mounted within the box 30 which forms a protective housing or junction box.

Turning now to the cartridge 12, the cartridge sections or halves 15, 15A may be substantially the same and interchangeable; therefore, only one section need be described in detail, and it will be understood that the corresponding structure on the other cartridge section will be identified by the same reference numeral followed by an "A".

Turning then to the cartridge section 15, it include first and second end walls 51, 52 and an outer sidewall generally designated 53. The end walls 51, 52 and the sidewall 53 cooperate to provide a central opening generally designated 55 in FIG. 4 for receiving (dispensing, in the case of section 15A) the adhesive trapping medium 13. The sidewall 53 has a first planar section 56, a curved intermediate portion 57 (FIGS. 1 and 9) and a second planar section 58 which is parallel to the first planar section 56 having the same length but which has a shorter width, so that when the two cartridge sections are placed together (FIG. 9) the adjacent edges of the larger planar sections 56, 56A of the two cartridge sections engage and close, but the adjacent edges of the two smaller planar sections 58, 58A provide an opening 59 in FIG. 9. This opening permits a user to look in a cartridge to determine whether it is a new cartridge or a spent cartridge.

Figure 4:
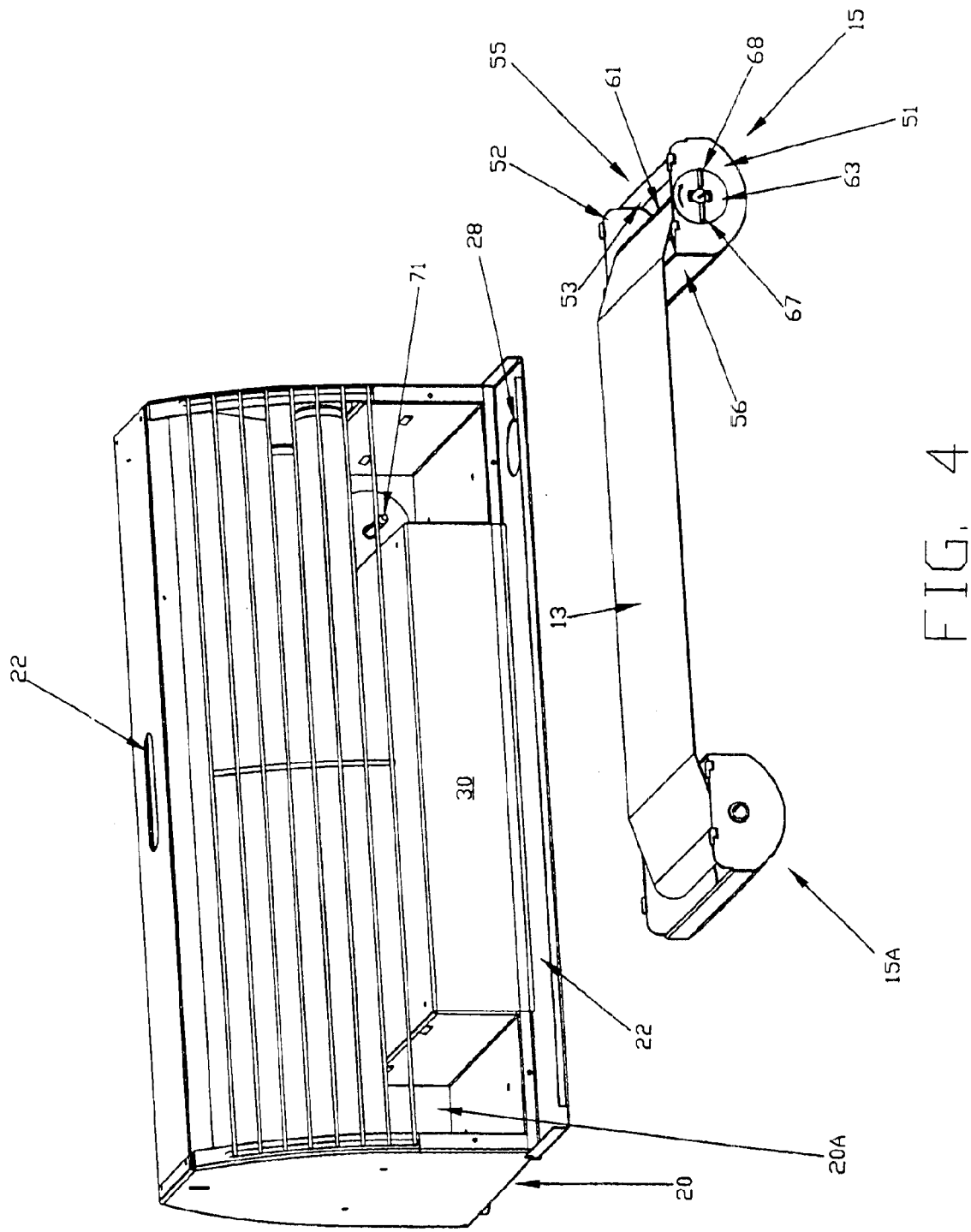
FIG. 4 is a view similar to FIG. 1 but at a slightly different angle so as to show the drive shaft of the motor which winds the trapping medium.

Returning now to the cartridge section 15, it is provided with a spool member 60 which may be plastic and includes an elongated tubular shaft (see shaft 61A for the left cartridge section 15A in FIGS. 3 and 4). The shaft of the spool 60 is journaled in the end walls 51, 52 of a cartridge section; and one end of the spool includes a circular flange 63 which is adjacent the outer surface of end wall 51 of the cartridge section 15 and slides against it when rotated. The adjacent portion of the shaft 61 is provided with a pair of opposing cantilever tabs, one of which is seen at 64 in FIG. 3. The tabs 64 have a free end adjacent the flange 63, but spaced inwardly slightly greater than the thickness of the wall 51. The free ends of the tabs 64 are also spaced farther apart from each other than is the diameter of the aperture in the end wall 51 in which the shaft 61 fits. The spool is maintained in place because the tabs 64 bear against the inner surface of the end wall 51, whereas the circular flange 63 bears against the outer surface of the end wall 51. Dimensions are such that the spool 60 freely rotates relative to the end wall 51. The spool may be removed by pinching the tabs 64 together so that they fit through the aperture in end wall 51, and then sliding the spool out.

The outer surface of the flange 63 includes a pair of opposing finger tabs 67, 68 so that the spool may be turned by hand, if desired, to advance the adhesive trapping medium manually.

The adjacent edges of the end walls 51, 51A and 52, 52A are also straight, and when the two cartridge sections are assembled together to form a container for the adhesive trapping medium, they engage one another, as seen in FIG.9. Each cartridge section end wall 51, 51A, 52, 52A is provided with a pair of locking tabs, designated 70A, 70B for the end wall 51 and 70C, 70D for the end wall 51A in FIGS. 3 and 9. Each of the locking tabs is L-shaped, in general, and includes a free extended finger such as the one designated 71 in FIG. 10 for the tab 70A. FIG. 10 is an enlarged view of the portion of FIG. 9 enclosed by the line 75. The fingers are provided with slightly extended pads or mounds designated 76, 76A for the fingers 70A and 70C shown in FIG. 10, so that when the adjacent end walls of the cartridge sections are placed together, spaced axially apart so that the fingers of the tabs of one section may be aligned to engage with the fingers of corresponding tabs of the other cartridge section as seen in FIGS. 3 and 9, facing opposite directions, the two cartridge sections may then be placed together so that their respective end walls engage, as shown in FIG. 9. The two cartridge sections are then moved relative to each other so that the axes of their central shafts become aligned. This locking motion is illustrated in FIG. 10 by the direction of the arrows 86. The tabs on the fingers inter-engage, with the pads on the fingers interlocking to secure the cartridge sections together, as seen in FIG. 10. In short, the cartridge sections are unlocked in FIG. 9 and locked in FIG. 10.

To insert a new cartridge, the cartridge sections are unlocked with a complimentary separating motion, and the two cartridge sections are then counter-rotated slightly and separated, as shown in FIG. 4. The cartridge sections are aligned with the receptacles 25, 26 of the trap housing, with the trapping web 13 located above the box 30, to slide along the horizontal top 31 of the box 30 which supports the insect trapping web 13. It will be understood that the same cartridge may be opened to create exposed regions of the trapping medium of different lengths, if desired, so that the same cartridge design could be used in traps of different sizes.

As the cartridges are placed in the receptacles, with the cartridge door 22 lowered to the position shown in FIG. 4, the distal end of the shaft of the spool 60 engages and telescopely receives a shaft 71 of an electric motor mounted to the fixed far wall 20A (FIG. 6) of the trap 11. The motor is conventional and provided with a rachet drive so that the spool may be manually wound, if desired. When in proper position, the web (or conventional glue board) rests on the top wall 31 of the enclosure box 30. The heat from the ballast housed within the enclosure 30 warms the adhesive medium resting on the top wall 31, making the glue more tacky, and thus more effective in securing insects. The warmth is also believed to increase the attractiveness of the adhesive medium to insects.

The leading edge of the insect trapping web 13 is secured to the shaft 61 of the cartridge section 15 (by tape, for example); however, the trailing edge is not secured to the shaft 61A of the cartridge section 15A. Thus, when the trapping material runs out, the trailing edge is pulled by means of the electric motor and wrapped around the spool 60. When the cartridge is spent, the trailing edge of the trapping medium leaves the cartridge section 15A and eventually passes over the aperture 32 in the top wall 31 of the box 30, thereby admitting light from the source UV fluorescent lamp 35 to the sensor 33 housed in the box 30 which generates an electrical signal to trigger the audible alarm 36.

Preferably, the upper surface of the insect trapping web 13 may be yellow and provided with pheromones, food scents to attract the insects once they get within the vicinity of the medium, and the upper surface of the web 13 is coated with an adhesive material to trap and immobilize the insects once they alight on the insect trapping surface. It may also be printed with images of flies which act as decoys.

The spool 60 may be turned manually not only to advance the insect trapping material if an unusually heavy catch has been made, but it may also be used to wind up the last section of the insect trapping medium when the insect trapping web is spent and it is desired to change the cartridge. When the cartridge is installed in the trap, and the lower cartridge door 22 is raised to the position shown in FIG. 2, the spool 60 aligns with the aperture 28, and a user may turn the spool by means of the tabs 67, 68.

The motor which drives the shaft 71 to advance the insect trapping web may have a plurality of speeds so that the advancing speed of the web may be adjusted for different conditions for different applications, or for changing conditions in the same site.

Having thus disclosed in detail the preferred embodiment of the invention, persons skilled in the art will be able to modify certain of the structure which has been disclosed and substitute equivalent elements for those illustrated while continuing to practice the principle of the invention, and is therefore intended that all such modifications or substitutions be covered as they embrace within the spirit and scope of the appended claims.

We claim:

1. A trap for flying insects comprising:

an exterior housing having first and second opposing sides, said sides facing opposite, generally horizontal directions, said housing further defining first and second elongated chambers and an ingress opening in each chamber, said ingress openings extending along said first and second opposing sides respectively to allow ingress by insects from either side of said housing along generally horizontal, opposing directions;

a lamp in each chamber for generating insect attractant light said lamps having generally horizontally aligned axes;

said housing further defining first and second receptacles located respectively on either side of said lamps, an adhesive medium being in the form of a roll;

a cartridge holding said roll of adhesive medium, said cartridge comprising first and second sections adapted to couple together to form a container, one end of said roll being secured in said first container section, the remainder of said roll of adhesive medium being contained in said second cartridge section, whereby said cartridge sections may be separated to align respectively with said receptacles of said housing, and be inserted therein, thereby placing said adhesive paper beneath and adjacent to said lamps;

said first cartridge section including a spool, an edge of said roll of adhesive medium attached to said spool, said spool being adapted to couple to the shaft of a motor within said housing when said first cartridge section is placed in one of said receptacles whereby when said shaft is rotated, said adhesive medium advances and is unrolled from said second cartridge section and rolled into said first cartridge section;

whereby a trailing edge of said roll of adhesive medium is freely located within said second cartridge section during normal use and as said adhesive medium is spent during usage, said free end of said roll is removed from said second cartridge section, and said spindle may be rotated manually to fully embody said roll in said second cartridge section;

wherein said first and second cartridge sections each include interlocking members for coupling to the opposing cartridge section when the two are assembled together, thereby encasing said roll within the assembled cartridge sections;

a reflective wall associated with each lamp, said reflective walls facing opposite, generally horizontal and downward directions, each reflective wall located substantially entirely above its associated lamp and being curved and extending generally parallel to an associated lamp, and spaced therefrom to reflect light emitted from the associated lamp directly outwardly through the associated ingress opening to attract insects, each lamp located to be viewed directly from either side of said housing from a slightly elevated angle; and said adhesive trapping medium extending in a generally horizontal plane beneath both lamps for securing insects alighting thereon, said trap characterized in that when approached from either of said first and second sides from a position slightly above the nearest lamp, both lamps and the nearest reflective wall may be viewed directly.

2. The apparatus of claim 1 wherein each lamp is located near the bottom of an associated ingress opening and wherein a lower edge of each reflective wall is located above the associated lamp to permit both of said lamps to be observed from lower elevations from outside the housing.

3. The apparatus of claim 1 wherein said first and second cartridge sections, when fully assembled, define an opening permitting a user to determine whether said cartridge is new or spent.

4. A trap for flying insects comprising:

an exterior housing having first and second opposing sides, said sides facing opposite, generally horizontal directions, said housing further defining first and second elongated chambers and an ingress opening in each chamber, said ingress openings extending along said first and second opposing sides respectively to allow ingress by insects from either side of said housing along generally horizontal, opposing directions;

a lamp in each chamber for generating insect attractant light said lamps having generally horizontally aligned axes;

an interior housing within said exterior housing, said interior housing adapted to house a drive motor and located beneath said lamps at the bottom of said exterior housing, and including an upper horizontal surface beneath said lamps, an adhesive trapping medium in the form of a roll mounted in said interior housing, said horizontal surface of said interior housing providing support for a portion of said adhesive medium during operation, said interior housing further being located in the center of said exterior housing and having first and second ends spaced respectively from sidewalls of said exterior housing to partially define receptacles for a plurality of cartridge sections; said cartridge sections adapted to contain said adhesive trapping medium;

a reflective wall associated with each lamp, said reflective walls facing opposite, generally horizontal and downward directions, each reflective wall located substantially entirely above its associated lamp and being curved and extending generally parallel to an associated lamp, and spaced therefrom to reflect light emitted from the associated lamp directly outwardly through the associated ingress opening to attract insects, each lamp located to be viewed directly from either side of said housing from a slightly elevated angle; and said adhesive trapping medium extending in a generally horizontal plane beneath both lamps for securing insects alighting thereon, said trap characterized in that when approached from either of said first and second sides from a position slightly above the nearest lamp, both lamps and the nearest reflective wall may be viewed directly.

5. The apparatus of claim 4 wherein said support surface of said interior housing defines an aperture permitting light from said lamps to pass therethrough and including a light sensor beneath said aperture for sensing whether an adhesive medium is located on said support surface and for generating a signal in the absence of adhesive medium covering said aperture.

* * * * *